United States Patent [19]
Dalton

[11] 3,903,600
[45] Sept. 9, 1975

[54] ELECTRIC HAND SAW GUIDE

[76] Inventor: Homer L. Dalton, c/o D. L. Kinney, Rt. 1, Rochester, Tex. 79544

[22] Filed: Nov. 20, 1974

[21] Appl. No.: 525,585

[52] U.S. Cl. ............................................... 30/376
[51] Int. Cl.² .................. B23D 47/02; B23D 51/02
[58] Field of Search ............................... 30/371–377

[56] References Cited
UNITED STATES PATENTS

| | | | |
|---|---|---|---|
| 3,536,112 | 10/1970 | Kordyban | 30/376 |
| 3,543,816 | 12/1970 | Thomas | 30/372 |
| 3,586,075 | 6/1971 | Larson | 30/376 |
| 3,586,077 | 6/1971 | Pease | 30/376 |

*Primary Examiner*—James L. Jones, Jr.

[57] ABSTRACT

This device consists primarily of a dove tailed guide bar slidable within the base plate of an electric saw. The device includes an adjustable mitre gauge, a spring with a steel point for keeping the saw from vibrating off mark, and a clamp is secured on the end of the guide bar for the purpose of securing the guide bar to the material being sawed and the device further includes angle adjustment for angular saw cuts in relation to the vertical.

3 Claims, 6 Drawing Figures

10

ELECTRIC HAND SAW GUIDE

This invention relates to electric saws, and more particularly to an electric hand saw guide.

It is therefore the principal object of this invention to provide an electric hand saw guide which is superior to those of the prior art due to the guide being built into the base plate of the saw thus rendering the saw portable with its self contained guide means.

Another object of this invention is to provide a saw guide of the type described, which will have pivotably secured to the guide bar member a mitre guage which will make adjustment possible for angle sawing of material and the mitre gauge will have a left hand thumb plate having secured thereto, a spring with point means for keeping the saw from vibrating off its mark when making a cut in material.

A further object of this invention is to provide a guide of the type described, which will have a clamp secured to the guide bar for the purpose of securing the guide bar to material being sawed and a calibrated degree of angle plate provides for cutting angles on the vertical plane.

Other objects of the invention are to provide an electric hand saw guide which is simple in design, inexpensive to manufacture, rugged in construction, easy to use and efficient in operation.

These and other objects will be readily evident upon a study of the following specification and the accompanying drawings, wherein:

FIG. 3 is a side view of the bar device shown removed from the saw.

Figure 1:
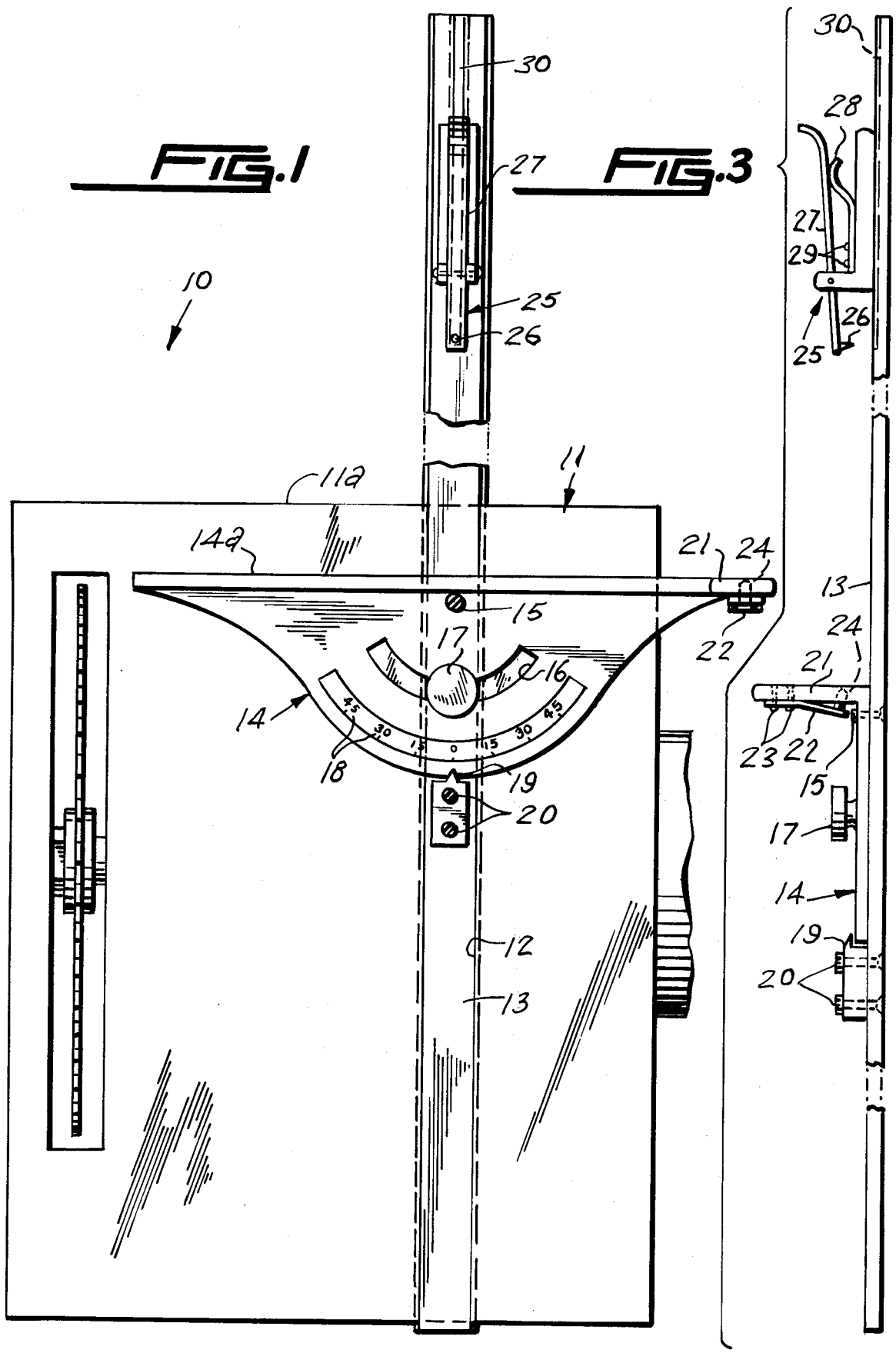
FIG. 1 is a bottom plan view of FIG. 2.

According to this invention, an electric hand saw guide 10 is shown installed within the base plate 11. A dove tail groove 12 parallel with the side edges of base plate 11 slidably receives a guide bar 13.

It will be noted that two guide bars 13, one of long length of approximately 4 feet in length and one of a shorter length, the shorter length not including a clamp, the combination enabling the user to cut small and large sheets of material. A mitre guage 14 is pivotably secured to guide bar 13 by fastener 15 and an arcuate slot 16 through mitre guage 14 provides for angle adjustment by the use of the adjustment screw 17 threadably received within guide bar 13. The mitre guage 14 is provided with degree calibrations 18 on its arcuately curved portion for accurately obtaining the number of degrees desired on a cut of material. A straight edge 14A extends from mitre guage 14 and includes an extending left hand thumb plate 21. A pointer 19 is secured fixedly to guide bar 13 by means of a pair of screw fasteners 20, the pointer 19 serving as alignment means for the desired degree of angle desired. Secured to thumb plate 21, is a leaf spring 22 secured thereto, by means of a pair of suitable fasteners 23. The opposite end of the leaf spring 22 has fixedly secured thereto, a point 24 which is urged within opening means of thumb plate 21 so as to prevent the saw from vibrating off of mark.

A clamp 25 on an end of guide bar 13, is provided with a point 26 fixedly secured thereto the arm 27 which is springingly urged outwards by means of spring 28 secured by fasteners secured to clamp 25. Clamp 25 is dove talied and slidable within dove tail slot 30 of the end of guide bar 13. Clamp 25 provides a means of securing guide bar 13 to the material being sawed and the mitre guage 14 enables the user to make cuts from 0 to 45°.

Figure 6:
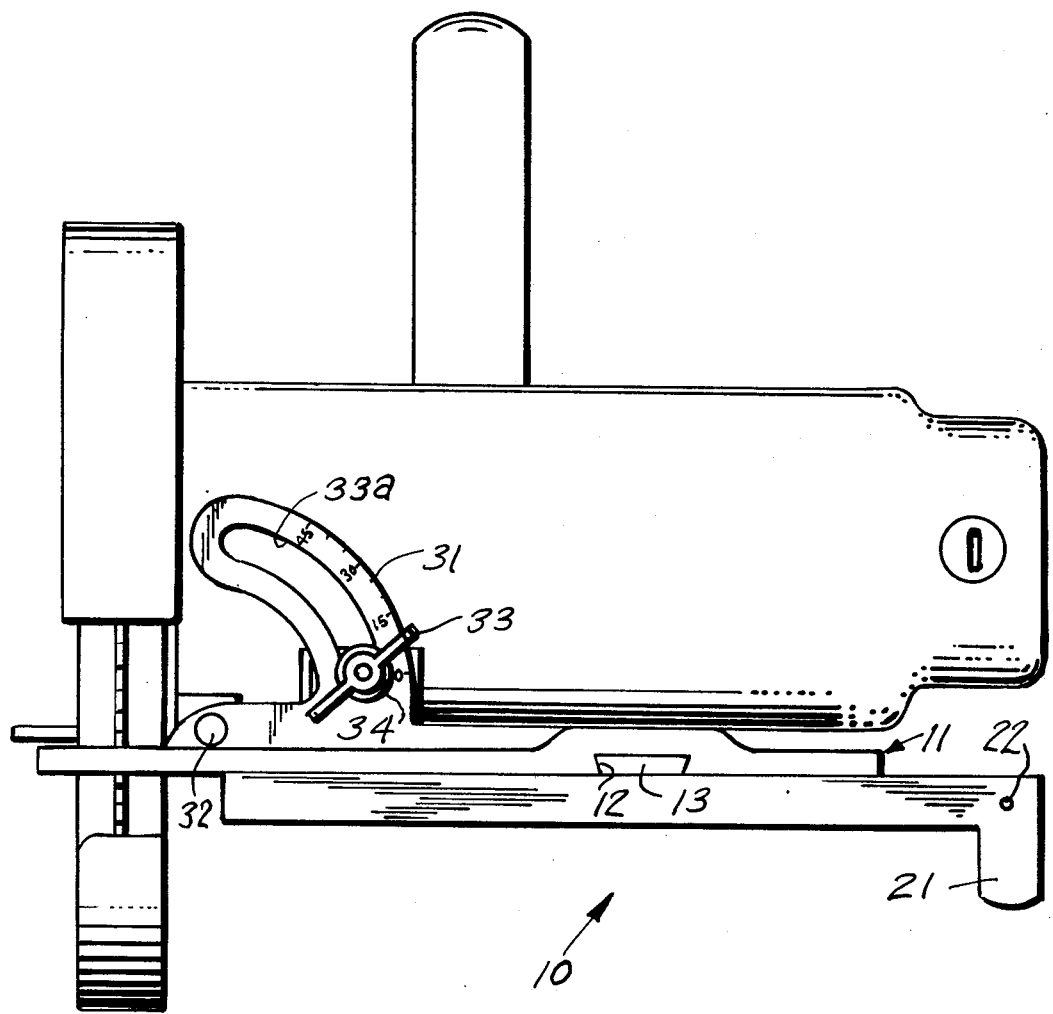
FIG. 6 is a front view of the saw and guide combination, shown in elevation.

Referring more particularly now to FIG. 6 of the drawing, a calibrated plate 31 is pivotably secured to the saw by means of a swivel point 32 of the saw housing and blade and a winged fastener 33 is freely carried within arcuate opening 33A of plate 31 so as to adjust for the degree of angle when cutting on a vertical plane. The winged fastener 33 bears against washer 34 when fastener 33 is tightened.

In use, the front edge 11A of the saw base plate 11 is placed upon the material to be sawed. The guide is pushed forward so as to make contact with the material while applying pressure with the left thumb to the counter sunk point 24, and the material. While holding the straight edge 14A firmly against the material, the saw can be pushed across the material to cut the desired angle. The guide bar 13 remains stationary while the saw follows the track of the guide bar 13.

It shall further be noted that the long guide bar 13 is for cutting larger sheets of the material and the clamp 25 is needed to hold the end of the guide bar 13 firmly in place.

It shall be even further noted, that the saw housing and blade will tilt 45 degrees in relation to the base plate 11 thus permitting angle cuts on a vertical plane as will be readily seen in FIG. 6 of the drawing.

Figure 2:
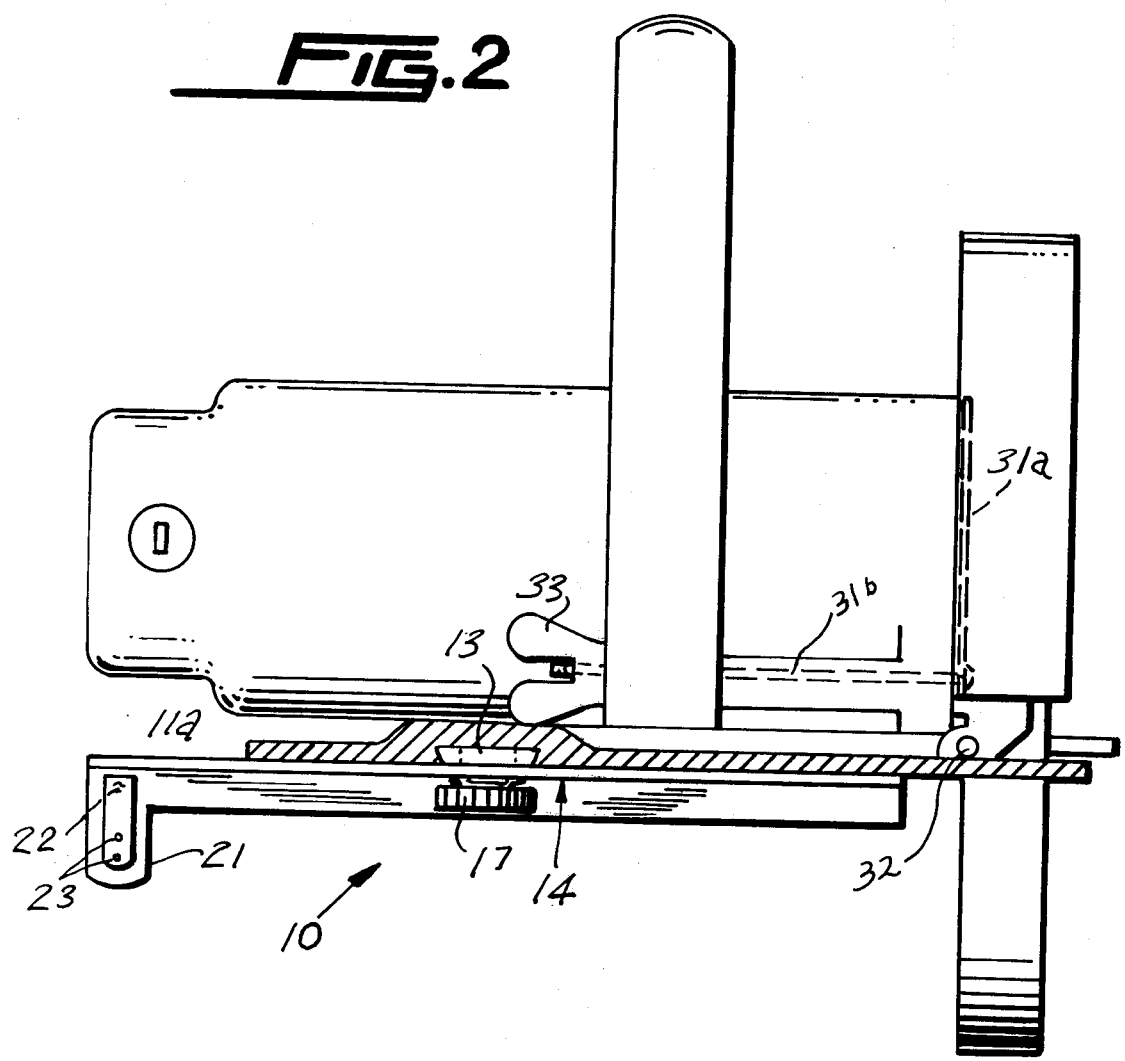
FIG. 2 is a rear end view of the saw shown in elevation and partly broken away.
Figure 4:
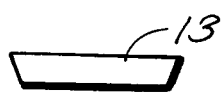
FIG. 4 is an enlarged end view of FIG. 3 shown in elevation.
Figure 5:
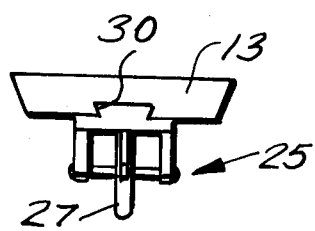
FIG. 5 is an enlarged view of the opposite end of FIG. 3, shown in elevation.

Referring to FIG. 2 of the drawing, it will be further noted that said base plate 11 can be adjusted to increase or decrease blade cutting depth. A pivotable slotted plate 31a is secured to the base plate 11 by means of a swivel point 32 and is secured to the saw housing by means of a bolt 31b and a winged fastener 33. Bolt 31b is freely carried within arcuate opening of plate 31a.

What I claim is:

1. An electric hand saw guide, comprising a pair of guide bar members of each of a different length, clamp means carried by the longer of said guide bars, a dove tail grooved base plate secured to an electric hand saw for receiving said guide bar, a mitre guage secured to said guide bar with pointer means and adjustment screw means, a thumb plate extending from said mitre guage with spring and point means for preventing the saw from vibrating off mark and a calibrated and arcuately configurated plate secured to said base plate with wing fastener means for adjusting for an angle of cut on the vertical plane.

2. The combination according to claim 1, wherein said mitre guage is secured to said guide bar by screw fastener means and said guide bar is slidable within the dove tail groove of said saw base plate, the mitre guage including said extending left hand thumb plate to which is secured fixedly, a spring by suitable fasteners, the opposite end of said spring having point means which counter sinks within said thumb plate.

3. The combination according to claim 2, wherein said clamp means is secured slidably within dove tail groove means in one end of the longer guide bar and pivotable arm means is secured within said clamp and is urged against by means of a leaf spring, said leaf spring being secured fixedly by suitable fasteners to said clamps slidable within said dove tail groove of said bar and vertical angle adjustment of said saw and saw housing includes said arcuately curved and degree calibrated plate secured to said grooved base plate of said saw, said plate having arcuate opening means in which is received the adjustment and locking means for the degree of angle on a vertical plane.

* * * * *